UNITED STATES PATENT OFFICE.

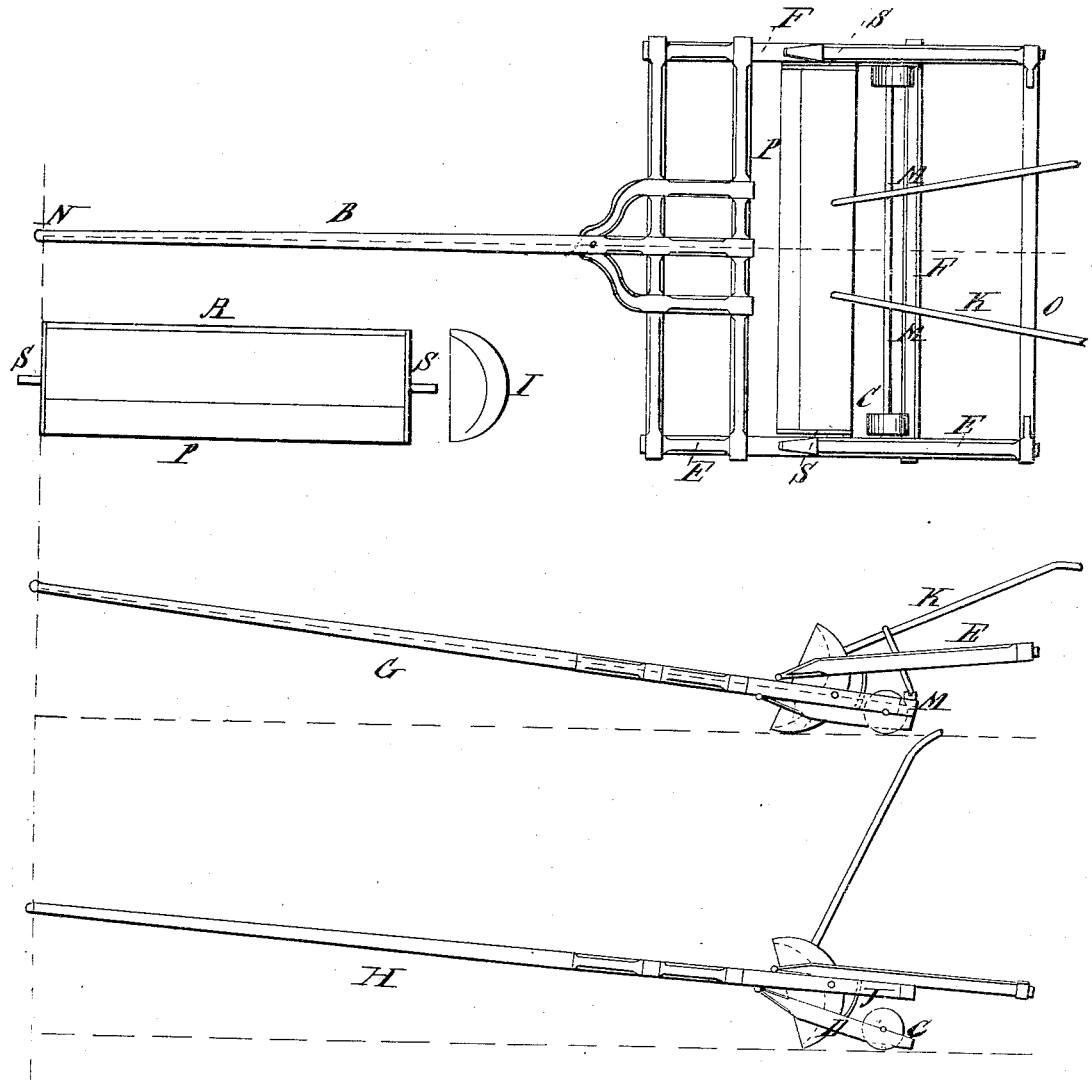

JOHN SCHOLDER, OF CANTON, OHIO.

SCRAPER FOR EXCAVATING AND REMOVING EARTH.

Specification of Letters Patent No. 1,341, dated September 25, 1839.

*To all whom it may concern:*

Be it known that I, JOHN SCHOLDER, of Canton, in the county of Stark and State of Ohio, have invented a new and Improved Machine for the Making, Constructing, Repairing, and Leveling of Roads and Ground Generally; and I do hereby certify that the following is a full and exact description for a machine of smaller size; but the proportions here given are those for a machine of a larger size, to wit:

A marked on the drawings is a concave semicylinder three feet six inches long and one foot six inches in diameter and hangs on centers, or pivots, or also an axle inserted into the frame fifteen inches from the posterior end thereof.

B, is a tongue passing between the horses or oxen by which the machine may be drawn, and is nine feet eight inches long from the frame, or the usual length in common wagons. C, the rollers or wheels, are ten inches in diameter and four inches thick, through which an axle of iron passes and is inserted into the runners or slides marked D, which are two feet three inches long and four inches square in thickness, and are fastened to and beneath the side pieces of the frame by a hinge or movable joint, two feet three inches from the posterior of the frame.

E, is a frame lever four feet two inches wide and three feet two inches long and three inches square in thickness, fastened by means of hinges or movable joints in the center of the side pieces of the frame projecting over the hinder part of the machine. F, the frame is four feet four inches square, (timber four inches square,) with a beam crossing before the semicylinder one foot four inches back from the front end of the frame into which is inserted the hounds connecting the tongue B with the machine, at the forward termination of which hounds the double and swingle trees in common use may be attached in the usual manner; K, the handles inserted into the convex side of the semicylinder, six inches from the upper edge and one foot from each end thereof and extend backward of the connecting bar of the frame lever and over its top; J, the fulcrum, (upon the top of which the side pieces of the frame lever E act in cylinder, for the purpose of filling it or emptying its contents, also to graduate the labor to be performed by the machine,) inserted into the runners or slides one foot two inches from their hinder ends, and passing up through the side pieces of the frame F. The bar marked O is attached to the side pieces of the frame lever E by iron straps passing around the hinder ends of frame lever E, which with the aforesaid straps forming a rotary joint, and by pressing down either side of frame lever E, thereby raising a corresponding end of the semicylinder, so as to accommodate the semicylinder to sideling ground and enable it to perform as much labor as on level ground.

L, is the hole in the tongue at its hinder part, to which the common double and swingle trees may be attached by means of a bolt.

M, are staples or rings inserted into the frame F in the hinder piece thereof, for the purpose of attaching the handles K by means of straps or chains to prevent the scraping edge of the semicylinder from going too deep. N, the ring at the end of the tongue, is for the purpose of attaching breast straps or chains to the horses or oxen in the manner usual to wagons.

P, is the scraping edge of the concave semicylinder A, which is plated with iron or steel both within and without, or clasping its edge.

S. S. are semicircular plates of iron fastened on the ends of the semicylinder, for the purpose of retaining its contents or preventing its escape at the ends; and

What I claim as my invention and desire to secure by Letters Patent is—

The combination of the scoop, attached to the frame F, with the runners and lever frame E, for the purpose of regulating the scoop in the manner described in the foregoing specification.

Aug. 6, 1839.

JOHN SCHOLDER.

Witnesses:
   WM. DUNBAR,
   NORMAN STIEGER.